(12) United States Patent
Weekly

(10) Patent No.: US 7,004,430 B2
(45) Date of Patent: Feb. 28, 2006

(54) THREAT-RESISTANT AIRCRAFT TRAY

(76) Inventor: Roy L. Weekly, 12186 N. 114th Way, Scottsdale, AZ (US) 85259

(*) Notice: Subject to any disclaimer, the term of this patent is extended or adjusted under 35 U.S.C. 154(b) by 166 days.

(21) Appl. No.: 10/167,883

(22) Filed: Jun. 12, 2002

(65) Prior Publication Data

US 2003/0230674 A1 Dec. 18, 2003

(51) Int. Cl.
*B64C 1/00* (2006.01)
(52) U.S. Cl. .................. 244/129.1; 16/248; 297/146; 297/151; 297/152; 297/153
(58) Field of Classification Search ............ 244/118.6, 244/122 R, 129.1, 118.1, 118.5, 1 R, 140–141, 244/110.5–110.6; 296/69; 297/146, 163, 297/188.06, 188.04, 188.2, 150–155, 113; 16/248
See application file for complete search history.

(56) References Cited

U.S. PATENT DOCUMENTS

| | | | | |
|---|---|---|---|---|
| 2,098,426 | A * | 11/1937 | McDonald | 297/146 |
| 2,278,014 | A * | 3/1942 | Olivant | 297/163 |
| 3,003,786 | A * | 10/1961 | Liston | |
| 3,425,744 | A * | 2/1969 | Epstein et al. | |
| 3,606,112 | A * | 9/1971 | Cheshier | 224/554 |
| 3,632,163 | A * | 1/1972 | Burnham | 297/155 |
| 3,899,982 | A * | 8/1975 | Fetzek | 108/25 |
| 4,159,071 | A * | 6/1979 | Roca | 297/163 |
| 4,174,669 | A * | 11/1979 | Lalonde | 108/44 |
| 4,303,272 | A * | 12/1981 | Berggren | |
| 4,442,780 | A * | 4/1984 | Child | 109/29 |
| 4,511,178 | A * | 4/1985 | Brennan | 297/146 |
| 4,668,010 | A * | 5/1987 | Fujiwara | 297/188.04 |
| 5,046,433 | A * | 9/1991 | Kramer et al. | |
| 5,131,607 | A * | 7/1992 | Arnold et al. | 244/118.6 |
| 5,169,209 | A * | 12/1992 | Beroth | 297/146 |
| 5,215,234 | A * | 6/1993 | Pasley | 224/508 |
| 5,346,279 | A * | 9/1994 | Pecorella | |
| 5,352,012 | A * | 10/1994 | Chowdhury et al. | 297/113 |
| 5,395,084 | A * | 3/1995 | Ikuma | 248/311.2 |
| 5,567,080 | A * | 10/1996 | Sterlacci | 403/322.1 |
| 5,813,354 | A * | 9/1998 | Scott | |
| 5,860,664 | A * | 1/1999 | Smith | 280/250.1 |
| 5,887,940 | A * | 3/1999 | Anderson et al. | |
| 6,059,238 | A * | 5/2000 | Reynolds et al. | 248/118 |
| 6,113,171 | A * | 9/2000 | Stearns | 296/26.08 |
| 6,123,304 | A * | 9/2000 | Bateson | 248/285.1 |
| 6,260,917 | B1 * | 7/2001 | Marechal | 297/163 |
| 6,601,523 | B1 * | 8/2003 | Jensen | 297/146 |

* cited by examiner

*Primary Examiner*—Michael Carone
*Assistant Examiner*—John A Radi
(74) *Attorney, Agent, or Firm*—Cahill, von Hellens & Glazer P.L.C.

(57) ABSTRACT

A detachable tray of the type usually pivotally attached to the seat back of a conventional airliner includes a layer of threat-resistant material for precluding penetration of a projectile from a firearm or sharp edged or sharp pointed weapon and serves in the manner of a shield to prevent injury to a person's shielded body parts. Where the economics of manufactur permit, the whole tray may be made of threat-resistant material. One or more handles or straps may be disposed on the bottom side of the tray to facilitate manipulation in positioning the tray to render it most effective to ward off an attack.

15 Claims, 2 Drawing Sheets

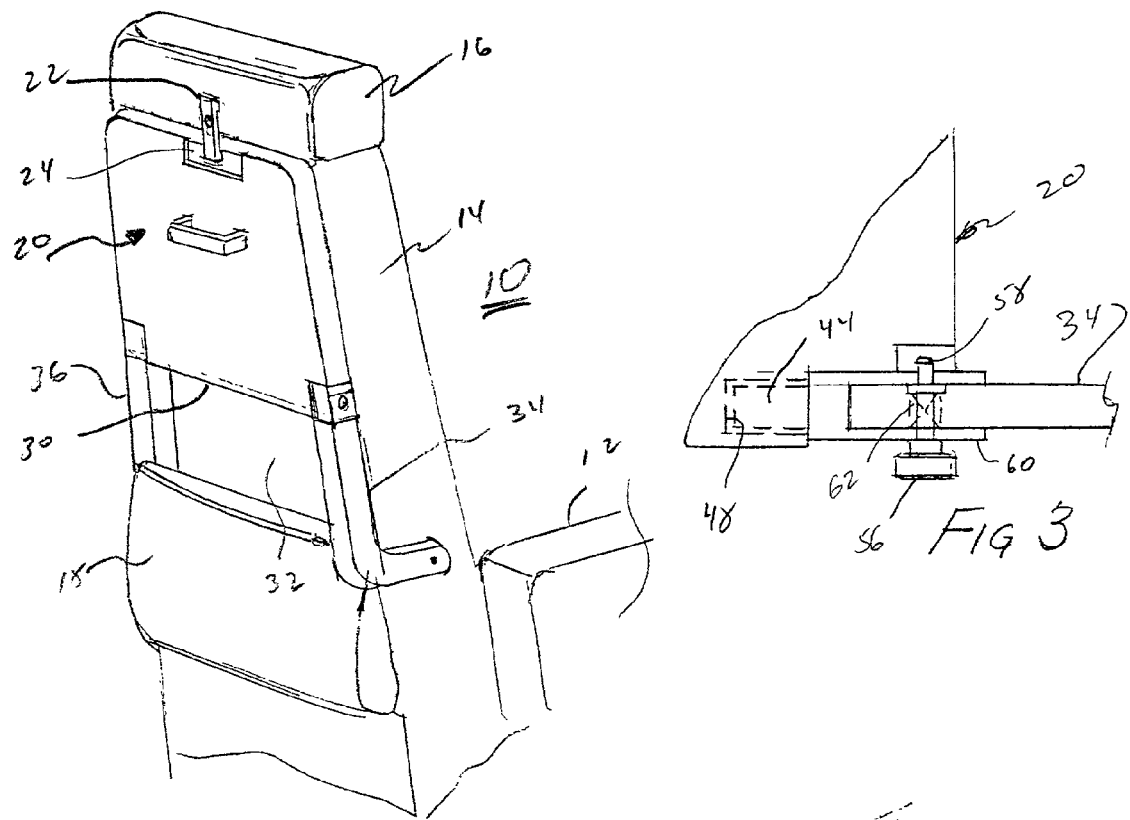
FIG 1
FIG 3
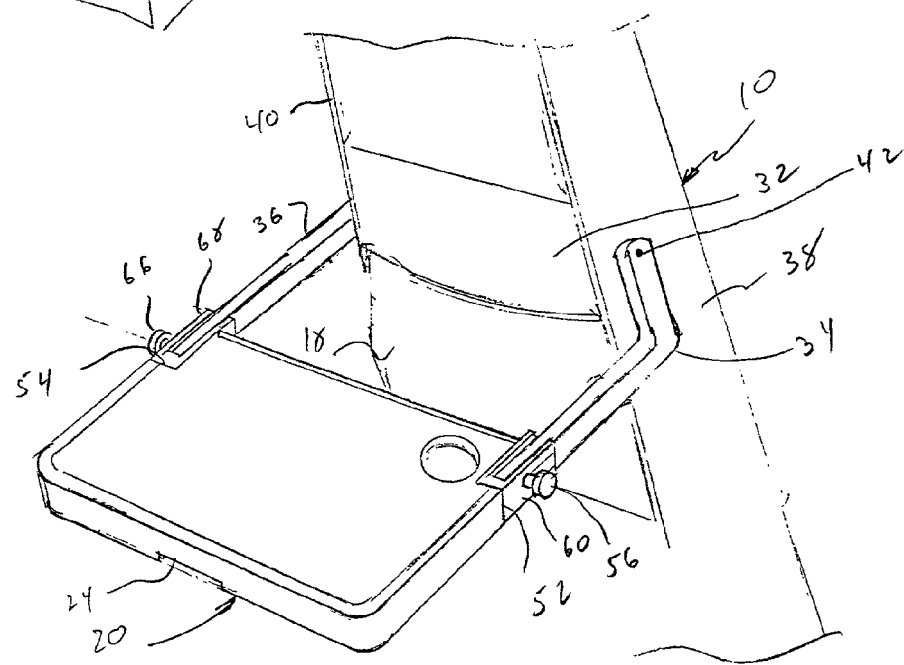
FIG 2

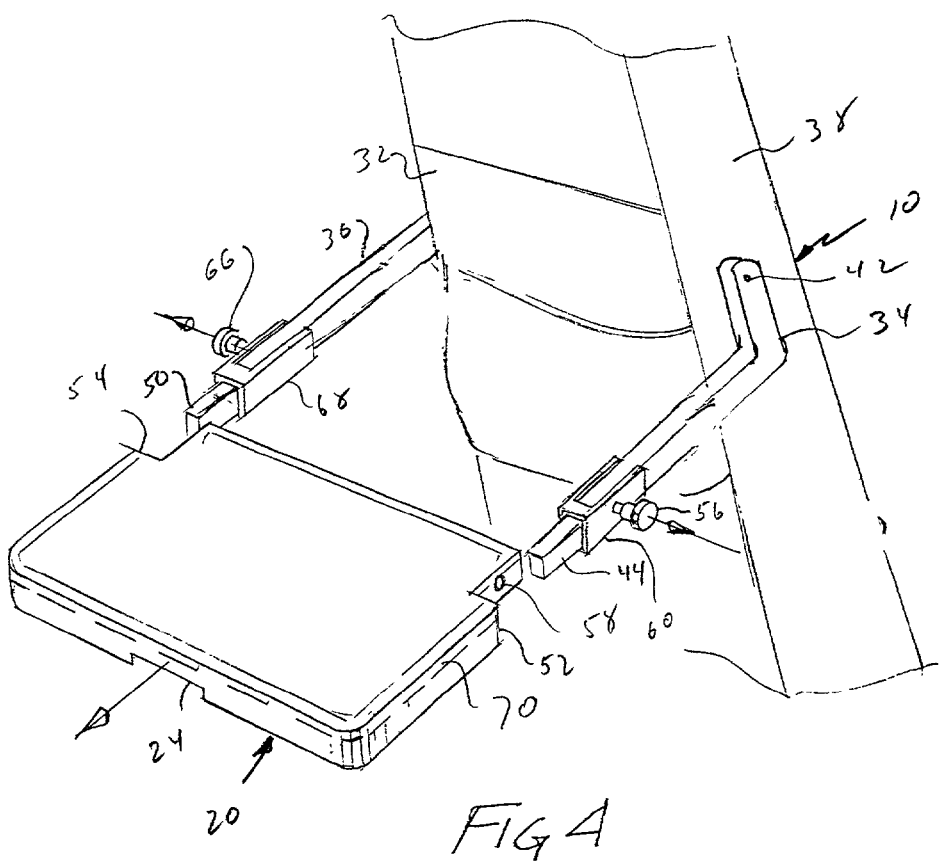
FIG 4
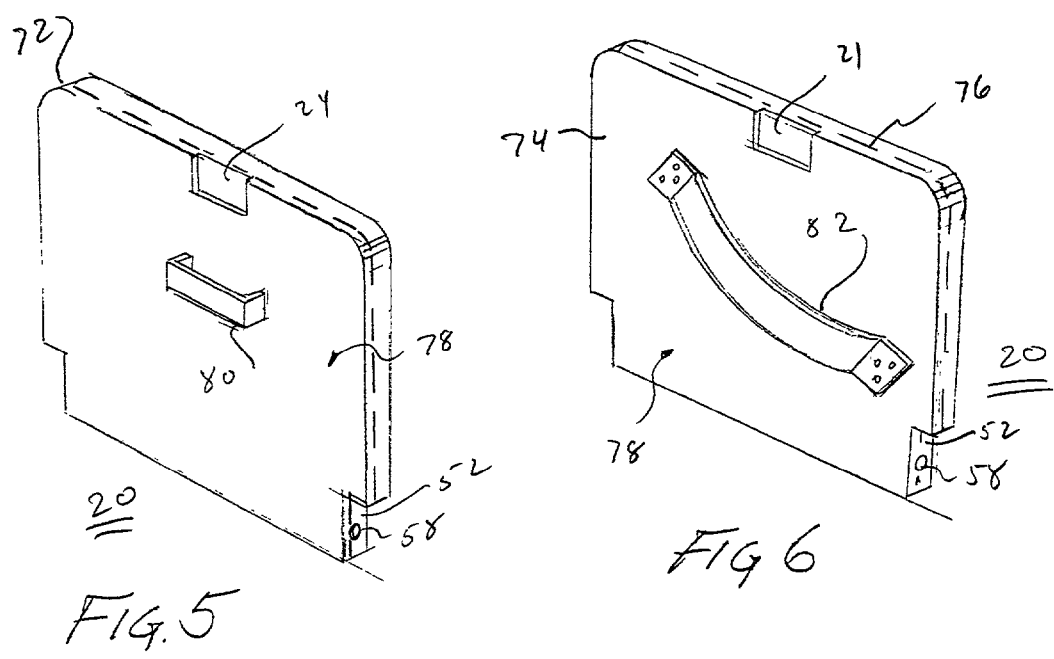
FIG. 5
FIG 6

THREAT-RESISTANT AIRCRAFT TRAY

BACKGROUND OF THE INVENTION

1. Field of the Invention

The present invention relates to portable body protective devices and, more particularly, to a tray for airline passengers usable to shield the user against injury from gunfire or an attacker having a sharp edged or sharp pointed weapon.

2. Description of Related Art

During medieval times chain mail was worn to minimize injuries from flying arrows, lances and during hand-to-hand combat. Garments of such chain mail were relatively effective but very heavy and tended to limit the agility and movement by a user. Similarly, rigid contoured plates were worn for the same purposes and had the same drawbacks. For the most part, these personal protective devices are not effective to prevent injury from gunfire due to the speed and size of projectiles discharged from presently available firearms.

As technology developed, particularly in the field of man made fibers, lighter weight materials are now available that offer significant resistence against penetration by projectiles discharged from currently available hand-held guns. Furthermore, these materials are essentially impenetrable to sharp edged instruments, such as knives of various sorts, bayonets, icepicks, scissors, etc., any of which could otherwise inflict a painful, debilitating or fatal injury. Consequently, the military and law enforcement personnel have used rigid, semi-rigid or flexible body armor made of some or all of these materials for years to protect themselves against injury from gunfire or a weapon wielding attacker. Materials of the type described above are sold by Dupont under the trademark Kevlar, by Allied Signal under the trademark Spectra, by Akzo Nobel under the trademark Twaron and by Toyobo under the trademark Dyneema. Collectively, these materials will be referred hereinafter as threat-resistant materials. Flexible metallic materials as well as various polymers would also be within this group of threat-resistant materials.

Since 1931, hijacking of airlines was practiced by hijackers for personal reasons or as part of a plan by an organization. Congress responded later with penalties of imprisonment for a convicted hijacker. In 1962, President Kennedy started the Federal Sky Marshals program. The primary function of the then twenty (20) sky marshals was to thwart the efforts of a hijacker in an attempt to protect the passengers. Unfortunately, the use of the sky marshals has been sporadic as a function of availability of funds and for political reasons.

Presently, passengers have no apparatus available to them for protection, except to the extent they have available and choose to use personal body protective devices. As threats of a hijacking or action by a terrorist are present, there exists a need for each passenger to have available in flight or while the aircraft is on the ground, a device that will stop a projectile from a firearm or an attack by a person wielding a sharp edged or sharp pointed instrument.

SUMMARY OF THE INVENTION

The present invention is a removable tray on the seat back of the seat in front of each passenger mounted within the cabin of a commercial airliner. The removable tray to be held by a passenger as a shield includes threat-resistant material located on one side or the other or internally to prevent penetration of a projectile from a firearm or penetration of a sharp edged or sharp pointed instrument and thereby protect a user against a potentially fatal injury. Alternatively, the complete tray may be made of threat-resistant material. Straps or grips may be attached to the tray to facilitate holding the tray in front of a user's body part to be protected against attack without unnecessarily exposing the user's hands and arms to injury.

BRIEF DESCRIPTION OF THE DRAWINGS

The present invention will be described with greater specificity and clarity with reference to the following drawings, in which:

FIG. 1 illustrates the back of a representative seat mounted within the cabin of a representative commercial airliner;

FIG. 2 illustrates a removable tray useful for protecting a user against attack and pivotally attached to a seat to permit its normal use as a conventional tray;

FIG. 3 illustrates a detailed view of a representative detachment mechanism;

FIG. 4 illustrates the tray removed from its support structure;

FIG. 5 illustrates a representative grip mounted on the back of the tray; and

FIG. 6 illustrates a further representative strap mounted on the back of the tray.

DESCRIPTION OF THE PREFERRED EMBODIMENT

On numerous occasions, passengers captive within the cabin of a commercial airliner have been attacked by persons committing mischief due to a mental imbalance or by persons in the act of hijacking the airliner. Generally, the passengers are essentially unprotected from such attack except to the extent that each may have sufficient skills in the field of martial arts to deflect such attack or subdue the attacker. As most persons have insufficient skills for this type of self protection, serious and often fatal injuries result. Attacks by mentally imbalanced persons or persons who seek to kidnap one or more passengers in other modes of public transportation, such as buses, trains, trams, boats and the like occur from time to time. These passengers are similarly essentially devoid of sufficient skills to protect themselves against debilitating or fatal injury.

At each of these public or quasi-public places, the persons are usually seated on cushioned or non-cushioned seats. If such seats have trays or the like detachably attached to the back of the seat in front by a quick disconnect means, such trays constructed in accordance with the present invention can be used to thwart or deflect attack from gunfire or a sharp edged or sharp pointed instrument and minimize any injury inflicted.

FIG. 1 illustrates a part of a representative seat 10, such as may be present in a commercial airliner. Moreover, a similar seat could be used in a bus, train or other mode of public transportation. Seat 10 generally includes fixed or repositionable armrests, such as armrest 12. Seat back 14 usually includes a headrest 16 formed as part thereof or as a detachably attached unit. A pocket 18 is generally located toward the lower end of the backrest for housing magazines, brochures, evacuation instructions, safety tips, etc. The seats used in commercial airliners generally have a tray 20 pivotally attached to the seat back to provide the passenger facing the seat back with a platform for beverages, food, etc. The rules and regulations of the Federal Aviation Administration (FAA) require that such a tray be in the closed position during takeoffs and landings to prevent injury to a passenger in the event of a mishap. Usually, a catch 22 is pivotally attached to headrest 16 to engage a receiving section 24 of the tray. Thereby, the tray is maintained in a closed position by manipulations of catch 22.

Bottom edge 30 of tray 20 may be pivotally attached to structure in back 32 of seat 10 by a conventional hinge. Alternatively, it may be pivotally attached by a pair of opposing pins supporting the tray directly or a mechanism extendable from back 32 to permit drawing tray 20 toward a user. In the embodiment shown with reference to FIGS. 1, 2 and 3, a pair of bent arms 34, 36 may be pivotally attached to opposing sides 38, 40 of the seat at pivot points, of which pivot point 42 is shown. The configuration of arms 34, 36 is provided to permit tray 20 to rest flush against back 32, as shown in FIG. 1, when the tray is in the upright position. In the position for use of the tray, as shown in FIG. 2, the tray is essentially horizontal and positioned in front of a passenger sitting behind seat 10. It is to be understood that various others mechanisms may be employed to secure tray 20 to seat 10 to provide for stowing the tray in an upright position adjacent back 32 and to position the tray in front of a passenger, with or without the capability for translating the tray horizontally toward and away from the passenger.

In order for tray 20 to be used in the manner of a shield to protect a user from being struck by a projectile fired from a firearm or to protect the user against injury from a sharp edged or sharp pointed weapon, tray 20 must be detachably attached to its supporting mechanism by some type of quick disconnect means. One such quick disconnect means or mechanism is particularly illustrated in FIGS. 2, 3 and 4. Free end 44 of arm 34 extends into a cavity 48 disposed in tray 20, as particularly shown in FIG. 3. Similarly, free end 50 of arm 36 extends into a similar cavity on the other side of tray 20. To accommodate insertion of ends 44, 50 indentations 52, 54 are developed in the tray. Spring loaded pin 56 extends through a hole in arm 34 into a cavity 58 extending interiorly from indentation 52. A sleeve 60 may be used to capture pin 56, its associated spring 62 and a retaining washer or element 64. A similar spring loaded pin 66 extends through a hole in arm 36 for engagement with a corresponding cavity in indentation 54. Similarly, a sleeve 68 may be employed to retain the mechanisms associated with spring loaded pin 66.

In operation, tray 20 is released by catch 22 and drawn downwardly and toward the passenger behind seat 10. Simultaneously therewith or subsequently thereto, pins 56, 66 are drawn outwardly to release the tray from retention by arms 34, 36. Upon such release, the tray becomes disengaged and may be used in the manner of a shield to protect the user.

Referring jointly to FIGS. 4, 5 and 6, details of tray 20 to permit it to serve the function of a shield will be described. Normally, trays 20 of the type used in commercial airliners are of relatively inexpensive light weight plastic or of other manmade material. The use of such a tray as a shield for protection purposes is minimally effective. To render tray 20 resistant to a projectile fired from a firearm or against penetration by a sharp edged or sharp pointed weapon, a top layer 70 may be of the type of material described above and identified as threat-resistant material. Such material has the capability for precluding penetration of the projectile from essentially all hand-held firearms. Similarly, such material will prevent penetration of any manually wielded sharp edged or sharp pointed weapon.

Alternatively, the threat-resistant material may be formed as a bottom layer 72 of tray 20, as shown in FIG. 5. Layer 72 has the same beneficial protective characteristics as those of layer 70 shown in FIG. 4. Under certain circumstances, it may be preferable to form tray 20 completely of threat-resistant material 74, as representatively shown in FIG. 6; or, a layer of threat-resistant material may be interleaved between the top and bottom surfaces of the tray as represented by dashed line 76.

To permit a user to manipulate and otherwise position tray 20 to protect a body part of the user without exposing the user's hands or arms, a grip, such as handle 80, may be formed as part of layer 72 or otherwise attached to tray 20, as illustrated in FIG. 5. It is to be understood that one or several handles may extend from bottom 78 of the tray or from the lateral or front sides. Alternatively, the grip may be a strap 82, as shown in FIG. 6, may be attached to bottom 78. Furthermore, more than one strap may be used to permit two handed holding of tray 20 or to permit a user to extend his/her arm through one of the straps and grip another strap.

Aside from use of tray 20 as a shield, it is apparent that the tray may be used as a weapon to strike an attacker in the manner of a cudgel or club.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. A tray detachably attached to a pair of arms pivotally attached to the back of a seat, each arm of the pair of arms having a free end, upon detachment of said tray from the pair of arms said tray being useable as a shield against injury from a projectile fired from a firearm or from a sharp edged or sharp pointed instrument, said tray comprising in combination:
   a) each cavity of a pair of cavities disposed in said tray adapted for slidably receiving a respective one of the free ends;
   b) quick disconnect means for detaching said tray from the pair of arms extending from the seat to permit sliding movement of said tray relative to the free ends of the pair of arms, said quick disconnect means including a first spring loaded pin extending from one arm of the pair of arms into engagement with said tray and a second spring loaded pin extending from another arm of the pair of arms into engagement with said tray; and
   c) threat-resistant material extending across said tray.

2. A tray as set forth in claim 1 wherein said threat-resistant material extends across a surface of said tray.

3. A tray as set forth in claim 1 wherein said tray includes at least one strap adapted for grasping to manipulate said tray.

4. A tray as set forth in claim 1 wherein said tray includes at least one grip adapted for grasping to manipulate said tray.

5. A tray as set forth in claim 1 wherein each of said first and second pins is adapted to extend from each arm of the pair of arms for retainingly engaging said tray.

6. A tray as set forth in claim 5 wherein said tray includes a pair of cavities for receiving an end of a respective one of the pair of arms.

7. A tray as set forth in claim 1 wherein said tray is fabricated from said threat-resistant material.

8. A tray as set forth in claim 2 wherein said threat-resistant material defines a surface of said tray.

9. A method for an airline passenger to protect himself/herself from injury from a projectile fired from a firearm by an attacker or from injury from a sharp edged or sharp pointed instrument wielded by an attacker, said method comprising the steps of:
   a) pivoting pair of arms pivotally secured to the back of an airline seat and slidably supporting a tray having threat-resistant material extending thereacross;
   b) relocating a pair of spring loaded pins extending from respective arms of the pair of arms into opposed sides of the tray to;
   c) sliding the tray out of engagement with the pair of arms; and
   d) grasping hand-held means secured to the tray to manipulate the tray for purposes of shielding a user's body parts from injury by an attacker.

10. The method as set forth in claim 9 wherein said step of relocating includes the step of sliding each pin of the pair of pins associated with each arm away from the tray to detach the tray.

11. The method as set forth in claim 10 including the steps of releasing a catch retaining the tray with the seat prior to exercise of said step of pivoting.

12. A tray attached to the back of a seat for use as a shield by a user to reduce the likelihood of injury from a projectile fired from a firearm by an attacker or from a sharp edged or sharp pointed instrument wielded by an attacker, said tray comprising in combination:
   a) threat-resistant material extending substantially across said tray;
   b) a support for detachably attaching said tray to the seat, said support including a pair of arms pivotally attached to the seat, each arm of said pair of arms including a free end;
   c) each of a pair of cavities disposed in said tray for receiving a respective one of said free ends;
   d) a pair of slidable spring loaded pins mounted within a respective arm of said pair of arms for penetrable engagement with said tray to removably retain each of said free ends within the respective cavity of said pair of cavities; and
   e) a grip for manipulating said tray as a shield to protect a user's body parts upon detachment of said tray from said pair of arms.

13. A tray as set forth in claim 12 wherein said support includes a pivot mechanism for pivoting said pair of arms relative to the seat prior to detachment of said tray from the seat.

14. A tray as set forth in claim 12 wherein said tray is formed of said threat-resistant material.

15. A tray as set forth in claim 12 wherein said grip comprises at least one strap.

\* \* \* \* \*